United States Patent [19]

Face, Jr. et al.

[11] 4,434,558

[45] Mar. 6, 1984

[54] SURFACE PROFILE MEASURING APPARATUS AND METHOD

[76] Inventors: Samuel A. Face, Jr.; Samuel A. Face, III, both of P.O. Box 6341, Norfolk, Va. 23508

[21] Appl. No.: 303,714

[22] Filed: Sep. 18, 1981

[51] Int. Cl.³ .............................................. G01B 7/34
[52] U.S. Cl. .................................... 33/174 P; 33/366
[58] Field of Search ............ 33/365, 1 E, 1 Q, 174 P, 33/285, 287, 338, 366, 286, 363

[56] References Cited

U.S. PATENT DOCUMENTS

| | | | |
|---|---|---|---|
| 811,739 | 2/1906 | Pelfry et al. | 33/384 |
| 1,829,257 | 10/1931 | Best et al. | 33/388 |
| 3,816,937 | 6/1974 | Burgin | 33/366 |
| 3,835,546 | 9/1974 | Jaquet | 33/338 |

Primary Examiner—Willis Little
Attorney, Agent, or Firm—Harvey B. Jacobson

[57] ABSTRACT

The difference in elevation between two closely spaced points on a surface is sensed by an instrument that is sequentially positioned at equally spaced locations along a measurement line to provide data from which a surface profile may be plotted. The instrument frame mounts a sensor having a sensitivity axis parallel to a contact line connecting pivot contact points at which the instrument engages the surface to provide a readout adjusted and calibrated to be in terms of vertical distance between the two contact points.

11 Claims, 8 Drawing Figures

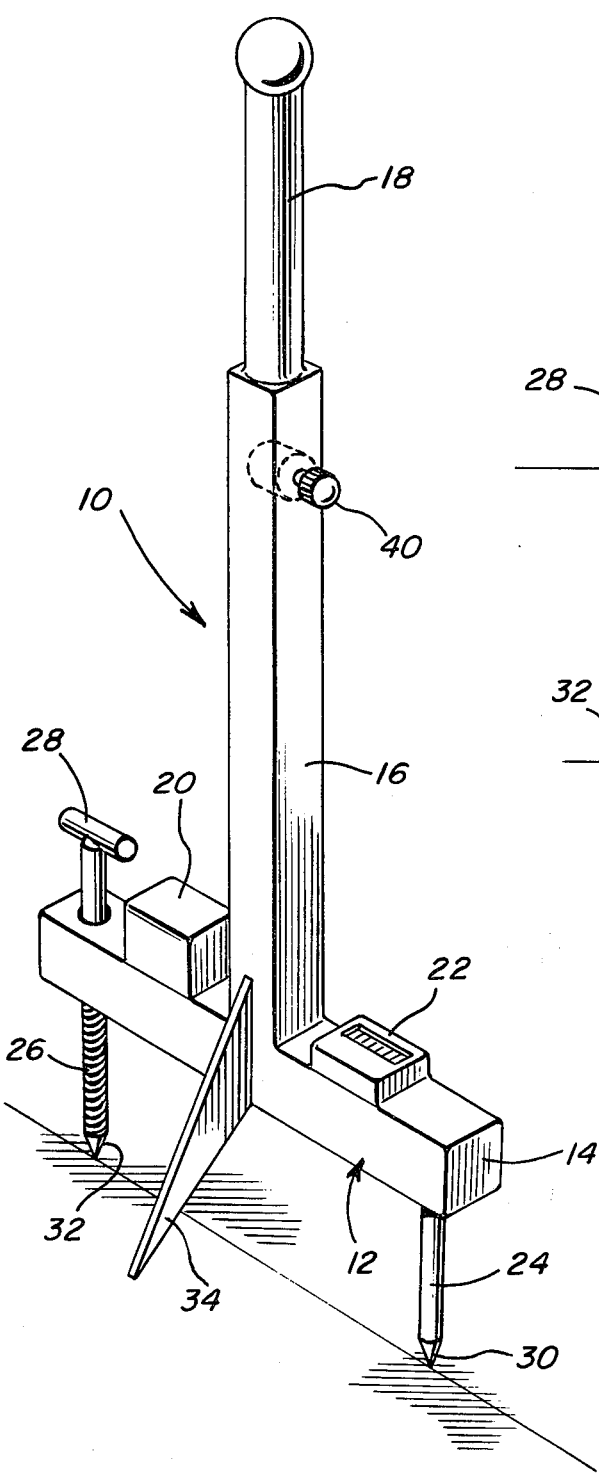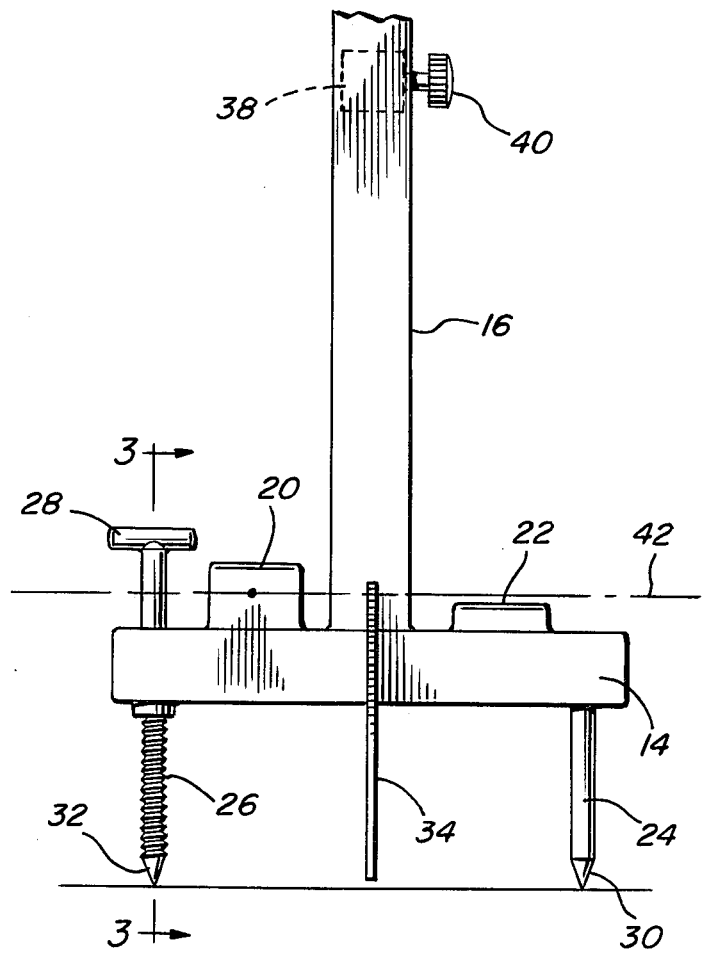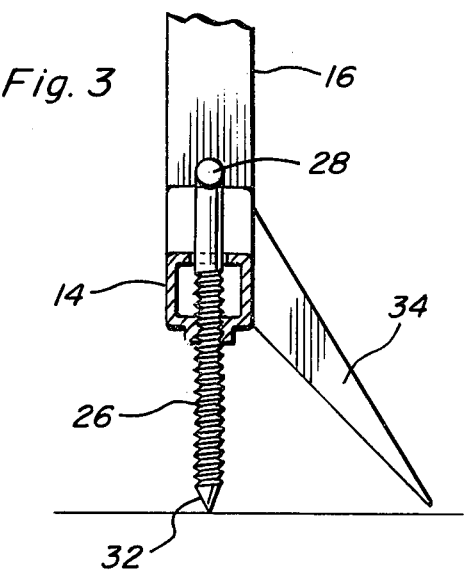

| Reading Positions | Reading ±(Vm) | Elevation ($P_1 = 0$) |
|---|---|---|
| $P_1 - P_2$ | −.15 | −0.15 |
| $P_2 - P_1'$ | −.07 | −0.22 |
| $P_1' - P_1'$ | +.02 | −0.20 |
| $P_2' - P_1''$ | −.12 | −0.32 |
| | | |
| | | |

RECORDED DATA CHART

SURFACE PROFILE MEASURING APPARATUS AND METHOD

BACKGROUND OF THE INVENTION

This invention relates to the measurement and evaluation of surface flatness, particularly with respect to concrete floors utilized in building construction.

The measurement of floor flatness or levelness is generally accomplished today by use of relatively long straight edges or point-to-point measurements made with transits and story rods or laser projectors and sensors. Only by use of transits or laser projectors, measurement data is produced from which surface profile plots may be drawn. However, the collection of elevation data by use of such equipment is slow and of questionable accuracy. For example, elevation differences between adjacent point locations of less than 1/16 of an inch are very expensive to measure with such equipment.

Because of the inability of existing equipment to provide floor surface measurements in a simple, accurate and standardized manner, considerable confusion exists in the construction industry with regard to the proper interpretation of flatness/levelness specifications and the establishment of realistic and enforceable tolerance values with respect to flatness or levelness. Accordingly, an important object of the present invention is to provide a relatively simple, rapid and standardized means for measuring and recording the surface profile of a floor surface with sufficient accuracy and repeatability to accommodate enforceable standards with respect to floor flatness/levelness.

Empirical studies with respect to commercial concrete floor surfaces indicate that such floor surfaces exhibit surface undulations having a small amplitude to wavelength ratio with a maximum wave amplitude of less than one-half inch and a wavelength (i.e. distance between high or low spots) within a limited range. Such dimensional characteristics of the surface undulations result from the physical dimensions of existing equipment utilized to place and finish concrete floor surfaces. It therefore follows that any proper evaluation of surface flatness or levelness requires plotting of a surface profile from measurement data obtained at points on the surface separated by less than one quarter the characteristic wave length of the surface undulations. The use of such small spacing between measurement points insures that the plotted profile will reveal all undulations in the surface. As hereinbefore indicated, the measurement of elevations at such closely spaced points heretofore involved a slow measurement procedure producing measurement data of questionable accuracy. It is, therefore, another important object of the present invention to provide apparatus and method by means of which rapid and accurate elevation measurements at closely spaced points on a surface may be made in order to plot a surface profile from which accurate and reliable evaluation of surfaces may be made.

SUMMARY OF THE INVENTION

In accordance with the present invention, a relatively simple measuring device is provided by means of which rapid and accurate elevation measurements differential may be made between equally spaced points along a measurement line on a floor surface. Equally spaced measurement points spaced apart by six inches, for example, are established by a unique sequential positioning or "walking" procedure utilizing a measuring device constructed in accordance with the present invention in order to provide recorded data from which surface profiles may be plotted. The device includes a digital voltmeter, by way of example, from which a reading is obtained in each of the sequentially repositioned locations of the device.

The measuring device of the present invention includes a rigid frame having a pair of frame supporting legs depending therefrom perpendicular to a sensitivity axis associated with an accelerometer type of inclination sensor mounted on the frame. Mechanical adjustment means is provided whereby pointed contact feet associated with the frame supporting legs engage a surface at contact points lying on a contact line parallel to the sensitivity axis of the inclination sensor. The signal output of the sensor is conditioned and adjusted so that the readout of the voltmeter to which the sensor is connected, will be in terms of the difference in elevation between the pointed contact feet where they engage the surface being measured. The spacing between these contact feet is fixed to establish the relatively short and equal distances between measurement points on the surface as aforementioned. Measurements at each of such measurement locations is obtained by sequentially repositioning the measurement device in a rapid and simple manner. Toward that end, a handle is attached to the frame of the measuring device through which it may be simply twisted in order to pivot the device about one of the contact feet in engagement with the surface in order to "walk" the device along a measurement line on which the measurement point locations lie. The measuring device with the two contact feet in engagement with the surface may be self-supporting by means of a rest formation projecting laterally therefrom forming a third supporting foot spaced between the supporting legs on which the pivot contact feet are mounted. The device may rest in a laterally tilted position from which it is manually displaced to a fully erected position in order to effect the pivotal repositioning thereof as aforementioned.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a measuring device constructed in accordance with the one embodiment of the invention.

FIG. 2 is a front elevation view of the device shown in FIG. 1.

FIG. 3 is a partial side section view taken substantially through a plane indicated by section line 3—3 in FIG. 2.

DETAILED DESCRIPTION OF PREFERRED EMBODIMENT

Figure 5:
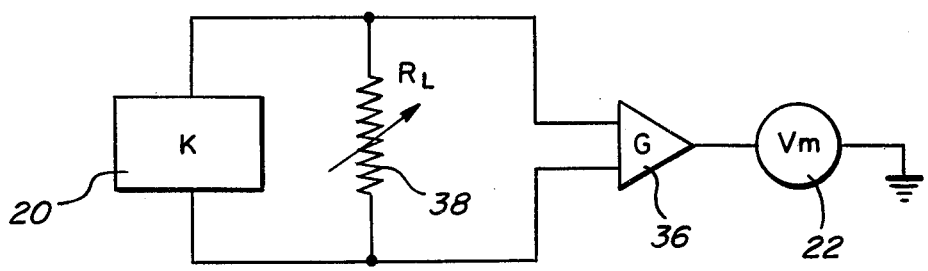
FIG. 5 is a simplified circuit diagram associated with the device shown in FIGS. 1-3.

Referring now to the drawings in detail, FIGS. 1–3 illustrate a surface measuring device constructed in accordance with the present invention, generally referred to by reference numeral 10. The device includes a rigid, inverted T-shaped frame 12 having a horizontally elongated housing portion 14 and a vertically extending housing portion 16. An elongated handle 18 extends upwardly from the frame portion 16 and is adapted to form an enclosure for a battery source of energy from which an inclination sensor 20 and a digital voltmeter 22 are energized, said sensor and voltmeter being mounted by the frame portion 14 on opposite sides of the vertical frame portion 16. A pair of frame supporting legs 24 and 26 depend from the frame portion 14 adjacent opposite longitudinal ends thereof. According to the illustrated embodiment, leg 24 is fixed to the frame while leg 26 is externally threaded for axial adjustment in response to turning thereof by means of a handle 28. The lower ends of the legs are provided with pointed surface contacting feet 30 and 32. Also extending downwardly at an incline from the frame between the legs 24 and 26, is a rest support element 34 adapted to establish a third supporting leg for stable three-point support of the frame on a surface, in a laterally tilted position. The inclination sensor 20 is a conventional or commercially available accelerometer type of sensing device, the signal output which is fed to the digital voltmeter 22. As shown in FIG. 5, the sensor is electrically connected to the voltmeter through a signal conditioning amplifier 36 or the like. An adjustable resistor or potentiometer 38 is connected across the output voltage terminals of the sensor. The circuitry illustrated in FIG. 5 may be mounted within the frame and resistor 38 may be adjusted through adjustment knob 40 as shown in FIGS. 1 and 2.

As shown in FIG. 2, a sensitivity axis 42 extends through the sensor 20 in fixed relation to the frame according to the illustrated embodiment. This axis is adjusted to be parallel to a contact line 44 on which the pivot contact points of feet 30 and 32 lie. The legs 24 and 26 are arranged perpendicular to the axis 42 so that the contact points will always be spaced from each other by a fixed amount along the axis 42. By mechanical adjustment of the leg 26, parallelism between the axis 42 and contact line 44 may be established.

Figure 4:
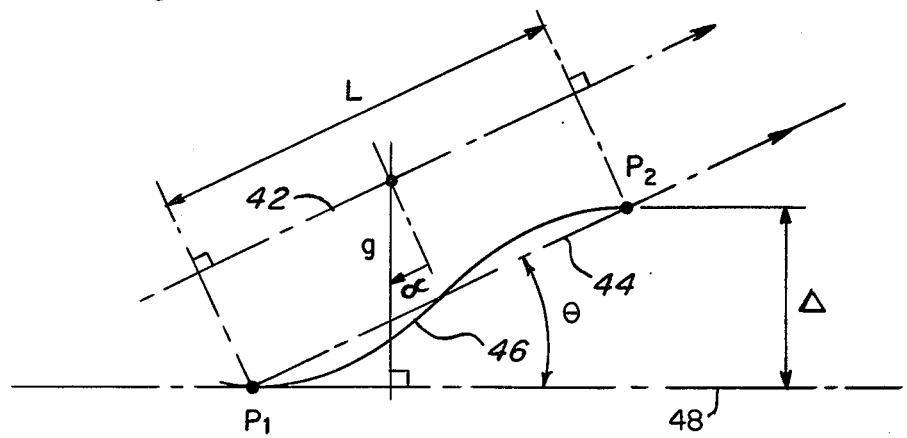
FIG. 4 is a geometrical diagram corresponding to use of the device shown in FIGS. 1-3.

FIG. 4 illustrates the geometric relationships of the device 10 when positioned on a surface 46 having a wavy curvature. The pivot contact feet 30 and 32 of the supporting legs engage the surface 46 at points (P1) and (P2) spaced apart a fixed distance (L). The sensor 20 will produce an output reflected by vector ($\alpha$) parallel to the axis 42 or contact line 44. A horizontal 48 perpendicular to the gravitational vector (g) extends through point (P1) on the surface 46 and is at an angle ($\Theta$) to the contact line 44 intersecting the surface curvature at point (P2), a vertical distance ($\Delta$) above point (P1). From the geometry shown in FIG. 4 and the electrical relationships applicable to the circuit of FIG. 5, it can be shown that:

$$Vm = R_L \frac{(GKg)}{L} \quad (1)$$

where
Vm is the readout in volts of the digital voltmeter 22,
G is the signal conditioning gain of amplifier 36,
K is the accelerometer constant of sensor 20,
g is the gravitational acceleration constant, and
$R_L$ is the resistance of resistor 38.

By adjusting the value ($R_L$) through adjustment knob 40, so that:

$$R_L = \frac{(L)}{(GKg)} \text{ constant,} \quad (2)$$

equation (1) becomes Vm $= \Delta$.

Accordingly, the reading of the digital voltmeter 22 will then be in terms of the difference in elevation ($\Delta$) between point (P1) and (P2) as denoted in FIG. 4.

Before any accurate readings are available from voltmeter 22, the device 10 must be zeroed and calibrated. For zeroing purposes, the device 10 is positioned on any substantially horizontal test surface and the locations thereon of points (P1) and (P2) marked before a first reading (Vml) is obtained from the voltmeter. The positions of contact feet 30 and 32 at the marked points (P1) and (P2) are then reversed and a second voltmeter reading (Vm2) is taken. An error value ($\epsilon$) is then calculated from the readings in accordance with the formula:

$$\epsilon = \tfrac{1}{2}(Vml + Vm2). \quad (3)$$

A corrected second reading (Vm2$-\epsilon$) is then calculated and the leg 26 is adjusted until the corrected reading appears on the voltmeter. After the device is so zeroed, it is repositioned on the surface until a level location is found where a zero reading appears on the voltmeter. At this level location, a gauge block having a thickness (t) is placed under leg 24 and ($R_L$) is adjusted through knob 40 until the voltmeter reads Vm=t. Except for correctly identifying the polarity of the sensor output, the device 10 will then be calibrated.

Figure 6:
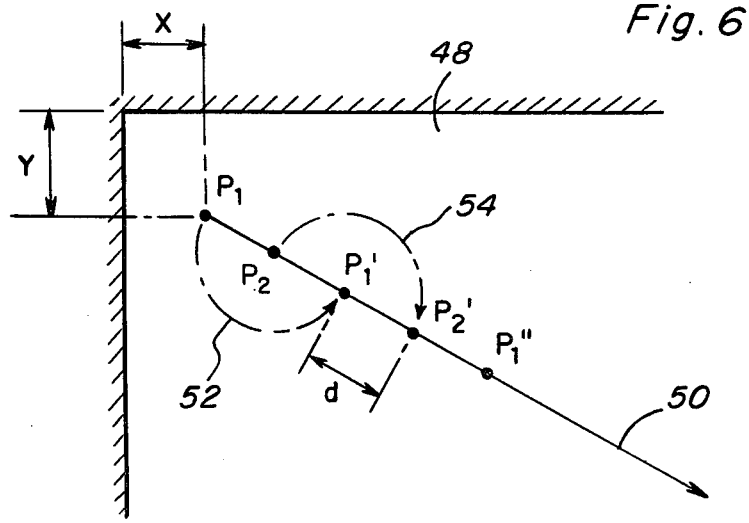
FIG. 6 is a diagrammatic top plan view of a measuring surface illustrating the data collection method associated with the present invention.
Figures 7, 8:
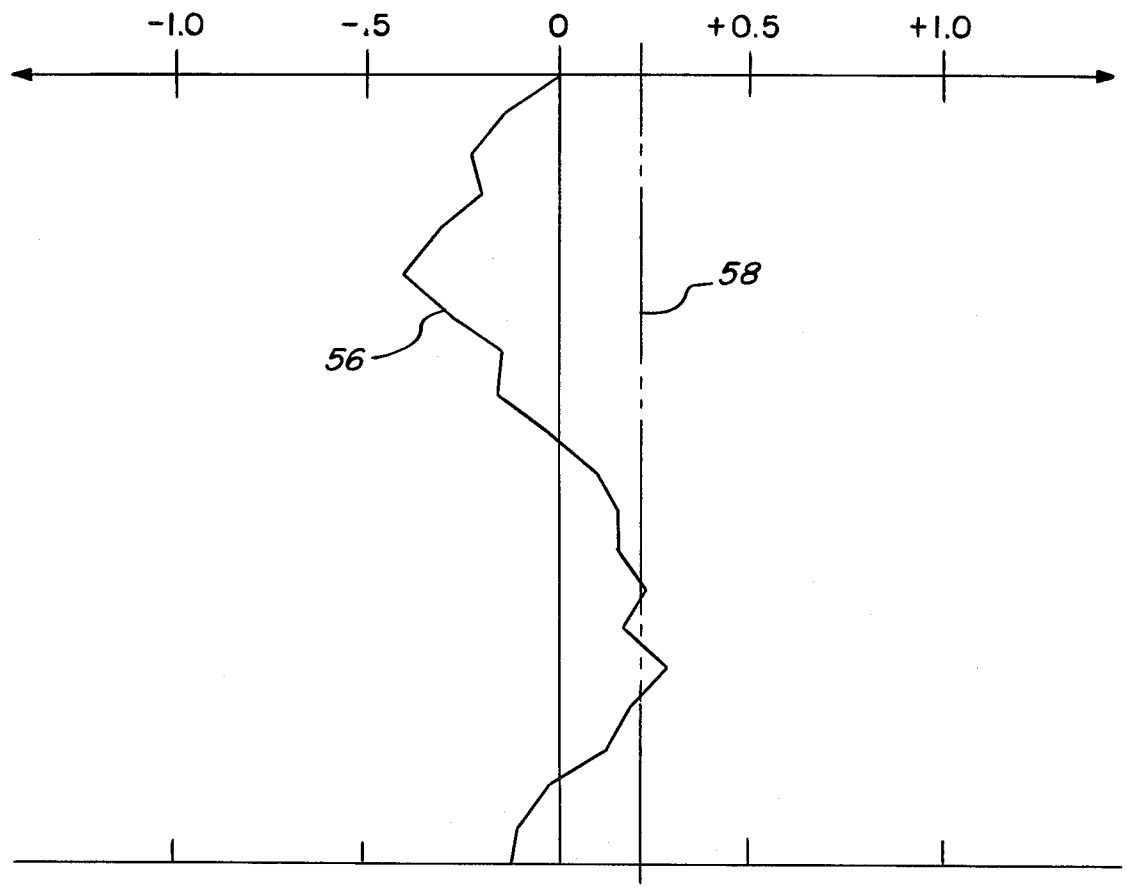
FIG. 7 illustrates a portion of a typical chart on which data is recorded from the measurements made in accordance with the present invention.
FIG. 8 is a graphical illustration showing a surface profile plot obtained by use of the data collected in accordance with the present invention.

FIGS. 6 and 7 illustrate the data collection method associated with the present invention utilizing the device 10 hereinbefore described after it is zeroed and calibrated. As a first step, a starting point (P$_1$) is selected on a floor surface 48 spaced measured distances X and Y from reference surfaces as shown in FIG. 6. From this starting point, a measurement line 50 is established on the surface 48 by use of chalk or other marking media, or marking means such as a taut string, a rigid straight edge, etc. then one of the contact feet 30 and 32 is placed on the starting point and the other contact foot positioned on line 50 to establish a second contact point P2. The reading of voltmeter 22 for this initial position of device 10 is then recorded. The device 10 is then pivoted about the second contact point P2 through arc 52 by 180° to establish a third contact point P1' on line 50 as shown in FIG. 6. A second voltmeter reading is then obtained for this second position of the device 10. The device is then pivoted again through a 180° arc 54 to the third position establishing point P2' on line 50 and a third voltmeter reading is recorded. The foregoing procedure is rapidly repeated by simply twisting the handle 18 to pivot the device about the pivot contact points established by alternate contact feet 30 and 32 of the device causing the device to "walk" along the measurement line 50. The elevation readings of the voltmeter 22 at each measurement position are thereby recorded for equally spaced point locations along line 50 as shown by way of example in the recorded data chart of FIG. 7. From such recorded data, a profile 56 of the surface 48 along line 50 may be plotted as shown in FIG. 8. An external datum such as a design floor grade line 58 may be drawn on the graph of FIG. 8 for surface profile comparison, analysis and evaluation purposes.

According to one embodiment of the invention, the spacing (L) between the contact points or contact feet 30 and 32 is approximately six inches which is less than ¼ the wavelength of the undulations in concrete floor surfaces presently found to be in a limited range. Such spacing between measurement locations insures a most complete indication of all waves in the profile plot 56.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a device for measuring flatness deviations of a surface profile having an undulation wavelength, including a rigid frame, an inclination sensor mounted on the frame and having a sensitivity axis extending therethrough, and signal readout means connected to the sensor for indicating inclination measurements of said sensitivity axis, the improvement comprising a pair of frame supporting elements mounted on the frame a fixed distance from each other along said sensitivity axis, each of the said supporting elements having surface contacting means engageable with the surface at point locations, means connected to the frame for angular displacement thereof about one of the point locations at which the frame may be pivoted, and signal adjustment means connected to the signal readout means for converting said inclination measurements into elevation differences between the surface contacting means of the respective frame supporting elements.

2. The improvement as defined in claim 1 wherein said surface contacting means establish fixedly spaced pivot points on the surface defining a contact line, and mechanical means for relative adjustment of the contact line and said sensitivity axis on the frame to positions parallel to each other.

3. The improvement as defined in claim 2 wherein said pivot points are spaced along the sensitivity axis a fixed distance equal to less than ¼ the undulation wavelength of the surface profile.

4. The improvement as defined in claim 3 including rest means connected to the frame for engagement with the surface in spaced relation to said surface contacting means to stablize self-support of the frame on the surface.

5. The improvement as defined in claim 1 including rest means connected to the frame and extending therefrom laterally of the axis for contact with the surface in spaced relation to said surface contacting means to stablize support of the frame on the surface.

6. In a device for measuring flatness of a surface having an undulation wavelength, including a rigid frame, an inclination sensor mounted on the frame and having a sensitivity axis extending therethrough, and signal readout means connected to the sensor for indicating inclination measurements of said sensitivity axis, the improvement comprising a pair of frame supporting elements mounted on the frame, each of said elements having surface contacting means for engagement with the surface at pivot points, said pivot points being spaced from each other a fixed distance less than ¼ of said undulation wavelength along a contact line parallel to said sensitivity axis for sequential angular positioning of the sensor at equally spaced positions along the contact line.

7. A method of determining the flatness of a surface, including the steps of: selecting starting point location on said surface; establishing a measurement line along said surface extending from the starting point location; sequentially measuring the inclination of the surface at equally spaced point locations along said measurement line; and recording said inclination measurements in terms of elevation differences between said point locations.

8. The method of claim 7 wherein said point locations are equally spaced from each other a distance less than ¼ of the wavelength of the profile waveform of the surface.

9. A method of determining the flatness of a surface utilizing the device as defined in claim 6, including the steps of: selecting a starting location on said surface at which one of the pivot points is placed; establishing a measurement line on said surface extending from the starting location; placing the other of the pivot points on the measurement line to support the device in an initial measurement position at which the reading of the readout means is recorded; and sequentially pivoting the device about alternate pivot points by 180° along said measurement line to equally spaced measurement positions at which the readings of the readout means are recorded.

10. A system for measuring flatness of a surface, including a frame, means attached to said frame for establishing a measurement line along said surface, an inclination sensor mounted on said frame, means connected to the frame for sequential angular positioning of the sensor at equally spaced measurement positions along said measurement line, and signal readout means connected to the sensor for registering differences between elevations of the sensor at each of the measurement positions.

11. The system as defined in claim 10 wherein said sensor positioning means includes a pair of legs connected to the frame, and surface contacting means mounted on each of the legs for engagement with the surface on said measurement line at fixedly spaced pivot points.

* * * * *